(12) United States Patent
Chang et al.

(10) Patent No.: US 11,698,496 B2
(45) Date of Patent: *Jul. 11, 2023

(54) FIBER OPTIC CONNECTOR ASSEMBLIES WITH ADJUSTABLE POLARITY

(71) Applicant: Senko Advanced Components, Inc., Marlborough, MA (US)

(72) Inventors: Jimmy Jun-Fu Chang, Worcester, MA (US); Kazuyoshi Takano, Tokyo (JP)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/444,675

(22) Filed: Aug. 9, 2021

(65) Prior Publication Data

US 2021/0364706 A1    Nov. 25, 2021

Related U.S. Application Data

(63) Continuation of application No. 16/373,624, filed on Apr. 2, 2019, now Pat. No. 11,112,565, which is a continuation of application No. 15/857,215, filed on Dec. 28, 2017, now Pat. No. 10,288,819, which is a continuation of application No. 15/423,884, filed on Feb. 3, 2017, now Pat. No. 9,927,582, which is a continuation of application No. 14/997,375, filed on Jan. 15, 2016, now Pat. No. 9,678,283.

(51) Int. Cl.
*G02B 6/38* (2006.01)

(52) U.S. Cl.
CPC ......... *G02B 6/3831* (2013.01); *G02B 6/3825* (2013.01); *G02B 6/3857* (2013.01); *G02B 6/3879* (2013.01); *G02B 6/3885* (2013.01); *G02B 6/3893* (2013.01); *G02B 6/3821* (2013.01)

(58) Field of Classification Search
CPC ... G02B 6/3831; G02B 6/3879; G02B 6/3893
See application file for complete search history.

(56) References Cited

U.S. PATENT DOCUMENTS 4,687,291 A * 8/1987 Stape ................... G02B 6/3893
                                                      385/59
5,712,938 A * 1/1998 Lin ...................... G02B 6/3878
                                                      385/139

(Continued)

OTHER PUBLICATIONS

Non-Final Office action of related U.S. Appl. No. 14/997,375 dated Oct. 12, 2016, 8 pages.

(Continued)

*Primary Examiner* — Omar R Rojas

(57) ABSTRACT

Connector assemblies having an adjustable polarity are described. A connector assembly having an adjustable polarity comprises a housing and a locking component configured to couple to the housing, the locking component including a compression element. The connector assembly further comprises a latch component configured to rotate around the locking component when the compression element is compressed to change the polarity of the connector assembly from a first polarity when the latch component is located at a first polarity position to a second polarity when the latch component is located at a second polarity position.

20 Claims, 11 Drawing Sheets

(56) References Cited

U.S. PATENT DOCUMENTS 8,727,638 B2 * 5/2014 Lee ...................... G02B 6/3879
                                                    385/139
9,678,283 B1 * 6/2017 Chang .................. G02B 6/3857

OTHER PUBLICATIONS

Non-Final Office action of related U.S. Appl. No. 15/423,884 dated Jul. 3, 2017, 10 pages.

* cited by examiner

FIBER OPTIC CONNECTOR ASSEMBLIES WITH ADJUSTABLE POLARITY

CROSS-REFERENCE TO RELATED APPLICATIONS

This application is a continuation of U.S. patent application Ser. No. 16/373,624, filed Apr. 2, 2019, which is a continuation of U.S. patent application Ser. No. 15/857,215, filed Dec. 28, 2017, now U.S. Pat. No. 10,288,819, which is a continuation of U.S. patent application Ser. No. 15/423,884, filed Feb. 3, 2017, now U.S. Pat. No. 9,927,582, which is a continuation of U.S. patent application Ser. No. 14/997,375, filed Jan. 15, 2016, now U.S. Pat. No. 9,678,283, which are all incorporated herein by reference in their entireties.

FIELD OF THE INVENTION

The described technology generally relates to components for connecting data transmission elements and, more specifically, to connector assemblies configured to facilitate the efficient changing of a polarity of the connector assembly without disassembling or substantially disassembling the connector assembly.

BACKGROUND

The reliability of communication infrastructure depends on secure and accurate connections between components, such as cable segments, network equipment, and communication devices. Large-scale data communication systems use fiber optic cables for data transmission between components. The fiber optic cables may be terminated by connector assemblies. Duplex connector assemblies, such as an LC connector assembly, may include a receiving optical fiber (typically labeled as "A") and a transmitting optical fiber (typically labeled as "B"). Such duplex connector assemblies may connect with an adapter having corresponding receiving (or "A") and transmitting ("B") ports. A duplex connector assembly is generally configured such that the receiving optical fiber connects with the transmitting port of the adapter and the transmitting optical fiber connects with the receiving port of the adapter.

A duplex connector assembly has a polarity based on the relative orientation of the receiving optical fiber and the transmitting optical fiber. Similarly, a corresponding adapter may have a polarity based on the relative orientation of the receiving port and the transmitting port. If the polarity of the connector assembly corresponds to the polarity of the adapter, the connection between the connector assembly and the adapter may successfully communicate data over the fiber optic cables joined by these two components. However, particularly in large installations, the polarity of the connector often does not correspond with the polarity of the adapter, leading to cross over and other communication issues. The connector assembly cannot simply be rotated to a correct polarity, as the connector assembly includes elements configured to secure the connector assembly to the adapter which prevent rotation.

Conventional techniques for changing an incorrect polarity of a connector assembly involve difficult and time consuming methods. For example, an installer may be required to remove the existing, incorrect connector assembly and prepare a new connector assembly on site. Other methods involve the use of special tools or high-cost connector components that may also require twisting or rotating the fiber, which may lead to damaged connections. Accordingly, telecommunication network providers would benefit from a connector assembly configured to allow for the efficient and effective changing of the polarity of the connector assembly on-site.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

According to one aspect, there is provided a connector assembly having an adjustable polarity, comprising a housing and a locking component configured to couple to the housing, the locking component including at least one compression element. The connector assembly further comprises a latch component configured to rotate around the locking component when the at least one compression element is compressed to change the polarity of the connector assembly from a first polarity when the latch component is located at a first polarity position to a second polarity when the latch component is located at a second polarity position.

In some embodiments, the locking component may be further configured to lock the latch component to prevent rotation of the latch component when the at least one compression element is not compressed. The at least one compression element may be configured to disengage the latch component from the locking component when the at least one compression element is compressed, thereby allowing the latch component to rotate. In some embodiments, the latch component may comprise at least one locking recess and the locking component may comprise at least one locking element configured to engage the locking recess.

In some embodiments, the housing may comprise an opening and the locking component may comprise a complementary projection configured to engage the opening. In some embodiments, the housing may comprise at least one channel configured to receive the at least one compression element. In some embodiments, the connector assembly may be a duplex LC-type connector.

In some embodiments, the latch component may comprise at least one thumb latch configured to secure the connector assembly to an adapter. In some embodiments, the at least one thumb latch may be configured to rotate with the latch component to change the polarity of the connector assembly. In some embodiments, the latch component may comprise a ring portion configured to couple to the locking component. The ring portion may include at least one locking recess and the locking component may comprise at least one locking element configured to engage the at least one locking recess. The at least one locking element may be configured to disengage from the at least one locking recess when the at least one compression element is compressed. The ring portion may be disposed about a first end of the locking component and the locking component may be configured to couple to the housing at a second end of the locking component.

Various embodiments may further comprise a back post and the latch component may be configured to rotate without removing the back post.

BRIEF DESCRIPTION OF THE DRAWINGS

The above and other objects of the present invention will become more readily apparent from the following detailed description taken in connection with the accompanying drawings.

DETAILED DESCRIPTION

The described technology generally relates to connector assemblies (for example, a plug, male connector, connector, or the like) having an adjustable polarity. In general, the connector assemblies have a plurality of orientations, alignments, or other physical attributes that cause the connector assemblies to have a plurality of polarities. In some embodiments, the connector assembly may only fit into and/or correctly connect with an adapter (for instance, a receptacle, female connector, adapter, or the like) in one or more of the polarities. The polarity of the connector assembly may be based on the relative orientation of components of the connector assembly, such as ferrules, a housing, a latch, a frame, or the like. For example, a connector assembly configured according to some embodiments may include two ferrules, a transmission ferrule and a receiving ferrule that may be arranged in one of a first polarity and a second polarity in order to form a successful connection with a corresponding adapter.

The connector assemblies and other data transmission elements described according to some embodiments herein may be connected within a network, which may include any type of network capable of transmitting signals, electricity, or any other type of transmission medium. For instance, the network may include, without limitation, a communication network, a telecommunication network, an electrical network, a data network, a computer network, and any combination thereof. In some embodiments, the network may include a communication network using various signal transmission mediums, including, without limitation, fiber optic networks, Ethernet networks, cable and/or satellite television networks, and any other type of communication network now known or developed in the future. In some embodiments, the sealable connector assemblies may be configured to connect cable segments and/or devices within a fiber optic network using various standard connector types and/or adaptors, including, but not limited to, LC, ST, SC, FC, DIN, D4, SMA, E2000, Biconic, FullAXS, OCD, small form-factor pluggable (SFP), MPO and/or copper-type network connections, such as RJ-45 type connectors. In some embodiments, the connector assembly may include a duplex LC-type connector and the connector assembly adaptor may include an SFP adaptor. In some embodiments the connector assembly may include a LC-type uniboot connector. In some embodiments, the connector assembly may include a unibody connector, for instance, that includes a round fiber optic cable.

Figure 1:
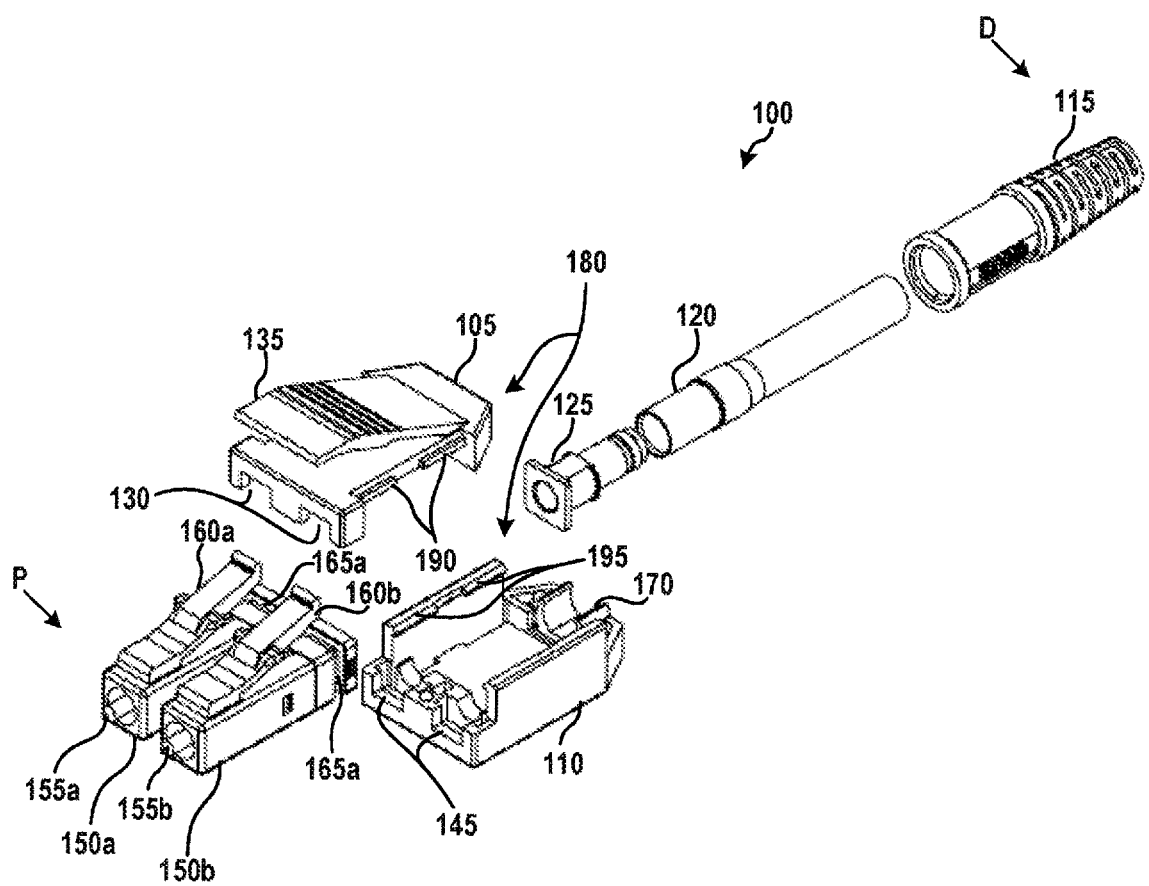
FIG. 1 depicts an illustrative connector assembly according to a first embodiment.

FIG. 1 depicts an exploded view of an illustrative connector assembly according to a first embodiment. As shown in FIG. 1, a connector assembly 100 may include a housing 180 formed from a top housing component 105 and a bottom housing component 110. The housing 180 may include a "closed" configuration when the top housing component 105 is coupled to the bottom housing component 110 and an "open" configuration when the top housing component 105 is not coupled to the bottom housing component 110. The top housing component 105 and the bottom housing component 110 may be securely coupled to each other using various means, such as a snap-fit, a friction-fit, or the like.

In some embodiments, the top housing component 105 may include one or more top projections 190 configured to engage corresponding locking projections 195 on the bottom housing component 110. As the top housing component 105 is being pushed onto the bottom housing component 110, the top projections 190 engage the locking projections 195, which may include a slanted top surface such that the force of the projections against the locking projections causes the side walls of the bottom housing component to extend outward to facilitate the movement of the projections past the locking projections and into the interior of the housing 180. When the top projections 190 have passed the locking projections 195, the side walls of the bottom housing component 110 return to their original position and the locking projections are positioned over the top projections, preventing movement of the top housing component 105 in an upward direction. Accordingly, the top housing component 105 is securely coupled to the bottom housing component 110. The top housing component 105 may be removed from the bottom housing component 110 using various processes, including prying on a portion of bottom housing component. For example, an installer may manually spread locking projections 195 apart and lift the top housing component 105 to remove the top housing component from the bottom housing component 110.

A cable (not shown) may extend through a boot 115 into the connector assembly 100. The cable may include two optical fibers (for instance, a transmitting optical fiber and a receiving optical fiber) terminating at a first ferrule 155a and a second ferrule 155b. For example, the first ferrule 155a may be coupled to a terminal end of a transmitting optical fiber and the second ferrule 155b may be coupled to a terminal end of a receiving optical fiber, or vice versa. A crimp ring and/or crimp tube 120, which may include a material, such as a heat-shrink material, may encase a portion of the cable and a crimp ring 120 may be secured to the cable. A back post 125 may engage the crimp ring 120 at a distal (D) end thereof. In some embodiments, as the crimp ring 120 is secured to the cable, the crimp ring may prevent movement of the back post 125 and, therefore, the housing 180, toward the distal (D) end of the connector assembly 100. In some embodiments, the back post 125 may be molded or otherwise affixed to a portion of the top housing component 105 or the bottom housing component 110. The back post 125 may be arranged within a channel 170 formed in the housing 180. In some embodiments, the back post 125 may be affixed to the channel 170 within the bottom housing component 110, such as through a snap-fit, a friction-fit, adhesive, or the like.

The first ferrule 155a and the second ferrule 155b may be arranged within a first plug frame 150a and a second plug frame 150b, respectively. The first plug frame 150a and the second plug frame 150b may be independent from each other. The top housing component 105 and the bottom housing component 110 may include recesses 130, 145 at a proximal (P) end thereof that are configured to engage corresponding channels 165a, 165b formed in the distal (D) end of the first plug frame 150a and the second plug frame 150b. In this manner, the first plug frame 150a and the second plug frame 150b may be secured within the connector assembly 100 when the housing 180 is in the closed configuration. In some embodiments, the first plug frame 150a and the second plug frame 150b may be coupled to the top housing component 105 and/or the bottom housing component 110 within the recesses 130, 145, such as through a snap-fit, friction-fit, or the like.

The first plug frame 150a and the second plug frame 150b may include a locking latch 160a, 160b configured to releasably couple the connector assembly 100 to a complementary adapter (not shown). The locking latches 160a, 160b may be depressable and may have sufficient flexibility such that the connector assembly 100 may be released from the adapter when the latch is activated with a moderate pressing force. The top housing component 105 may include a thumb latch 135 configured to engage the locking latches 160a, 160b. The thumb latch 135 may be positioned on the housing 180 such that individual locking latches 160a, 160b may be triggered by a single thumb latch 135 on the housing. The thumb latch 135 may be configured to depress the locking latches 160a, 160b at substantially the same time.

Figure 2A:
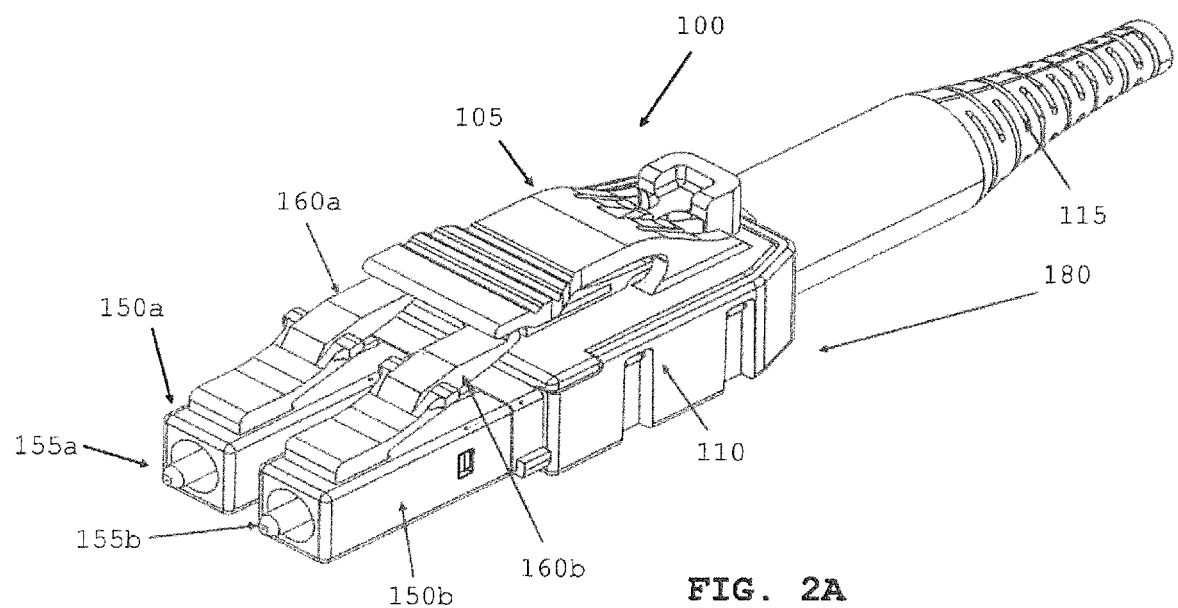
FIGS. 2A-2C depict an illustrative connector assembly according to the first embodiment.
Figure 2B:
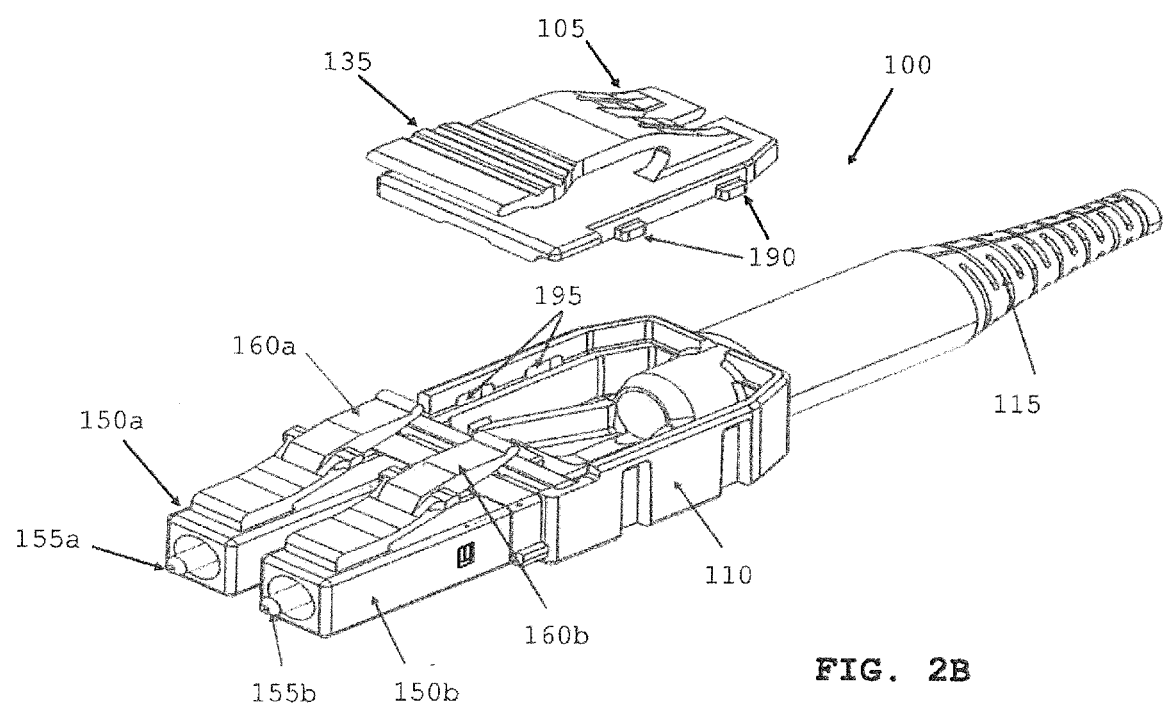
Figure 2C:
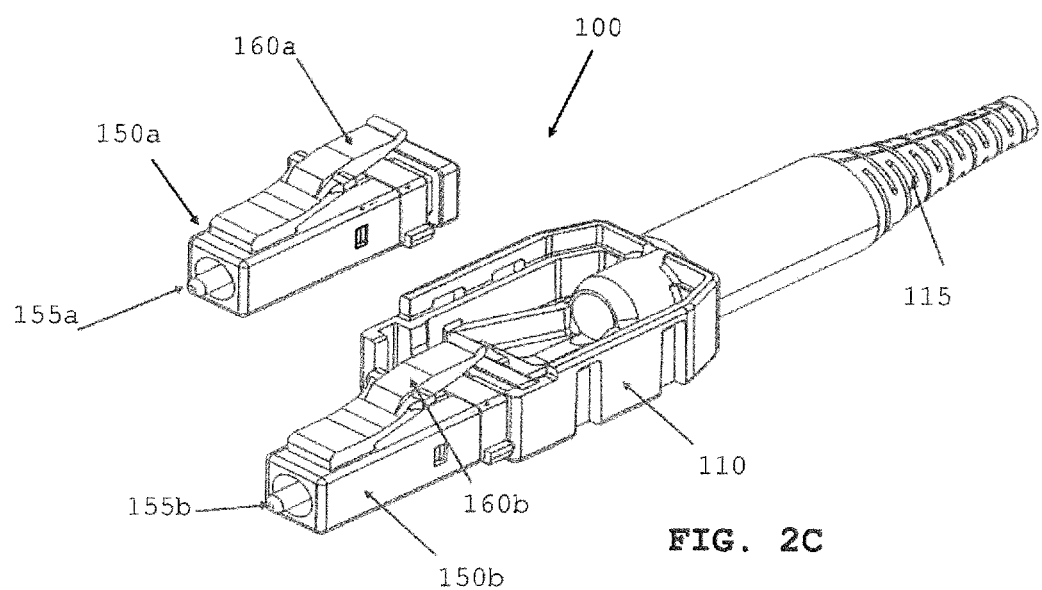

FIGS. 2A-2C depict an illustrative connector assembly according to the first embodiment. FIG. 2A depicts the connector assembly 100 with the housing 180 in the closed position and having a first polarity in which ferrule 155a is located on the left and ferrule 155b is located on the right. In FIG. 2B, the housing component 180 is in the open configuration in which the top housing component 105 has been disconnected from the bottom housing component 110 exposing the interior of the housing and allowing access to the first plug frame 150a and the second plug frame 150b. As shown in FIG. 2C, the first plug frame 150a and the second plug frame 150b may be independently moved from the bottom housing component 110 when the housing 180 is in the open configuration. Accordingly, the position of the first plug frame 150a and the second plug frame 150b and, therefore, the first ferrule 155a and the second ferrule 155b, may be switched within the connector assembly 180. In this manner, the connector assembly 100 may be adjusted to have a second polarity in which ferrule 155a is located on the right and ferrule 155b is located on the left. Once the polarity of the connector assembly 100 has been adjusted, the top housing component 105 may be coupled to the bottom housing component 110 and the connector assembly may be connected to a corresponding adapter.

Figure 3A:
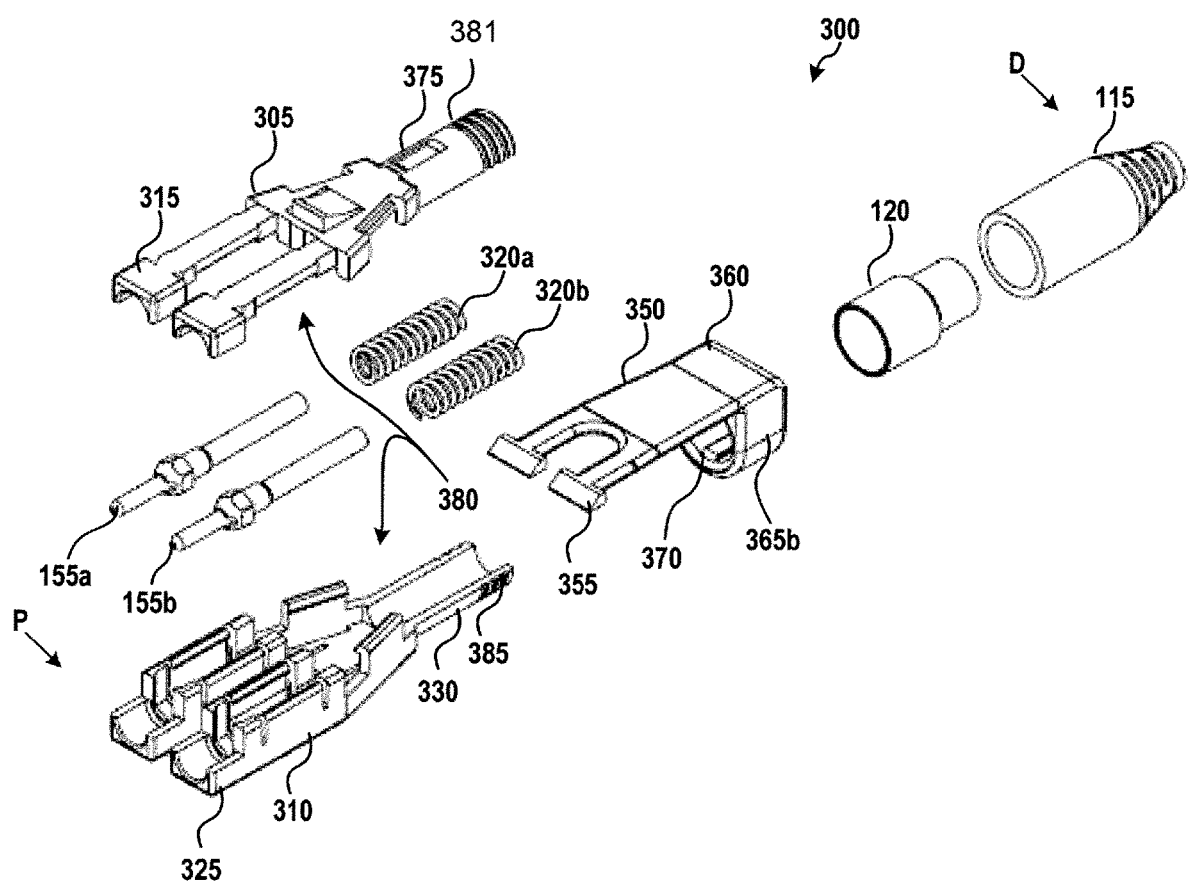
FIGS. 3A-3F depict an illustrative connector assembly according to a second embodiment.

FIGS. 3A-3F depict an illustrative connector assembly according to a second embodiment. In particular, FIG. 3A depicts an exploded view of an illustrative connector assembly according to the second embodiment. A connector assembly 300 may include a frame (or "housing") 380 configured to securely house a first ferrule 155a and a second ferrule 155b, springs 320a, 320b, and other internal components not shown in FIG. 3A. The frame 380 may include a top frame component 305 configured to be coupled to a bottom frame component 310, both of which may include a back post portion 381, 385 and a plug frame portion 315, 325. At least a portion of the plug frame portion 315, 325 may be configured to engage and/or be inserted into a corresponding port of an adapter. The top frame component 305 and the bottom frame component 310 may be securely coupled to each other using various means, such as a snap-fit, a friction-fit, an adhesive, or the like.

A cable (not shown) may extend through a boot 115 into the connector assembly 300. The cable may include two optical fibers (for instance, a transmitting optical fiber and a receiving optical fiber) terminating at the first ferrule 155a and the second ferrule 155b. For example, the first ferrule 155a may be coupled to a terminal end of a transmitting optical fiber and the second ferrule 155b may be coupled to a terminal end of a receiving optical fiber, or vice versa. A crimp ring 120 may be secured to the cable. The post portion 381, 385 may engage the crimp ring 120 at a distal (D) end thereof. As the crimp ring 120 is secured to the cable, the crimp ring may prevent movement of the post portion 381, 385 and, therefore, the frame 380, toward the distal (D) end of the connector assembly 300.

A latch component 350 may include a ring portion 360 arranged around a distal (D) end of the frame 380. The latch component may include a thumb latch 355 configured to releasably couple the connector assembly 300 to a complementary adapter (not shown). The thumb latch 355 may be depressable and may have sufficient flexibility such that the connector assembly 300 may be released from the adapter when the latch is activated with a moderate pressing force.

Figure 3B:
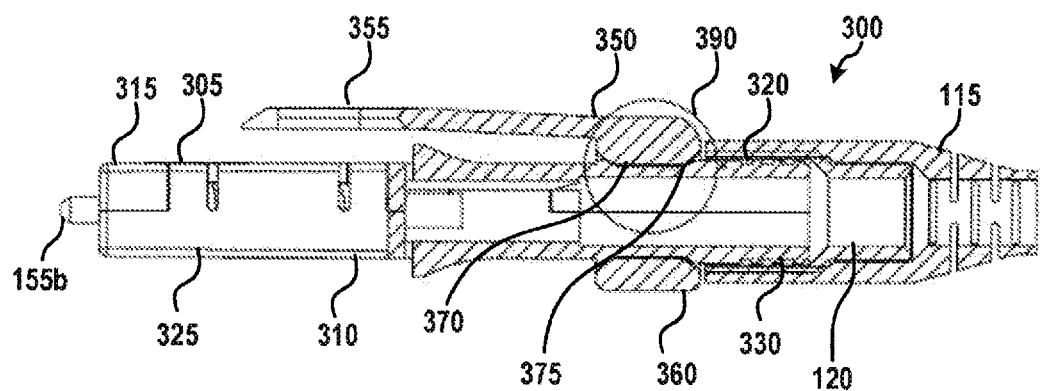
Figure 3C:
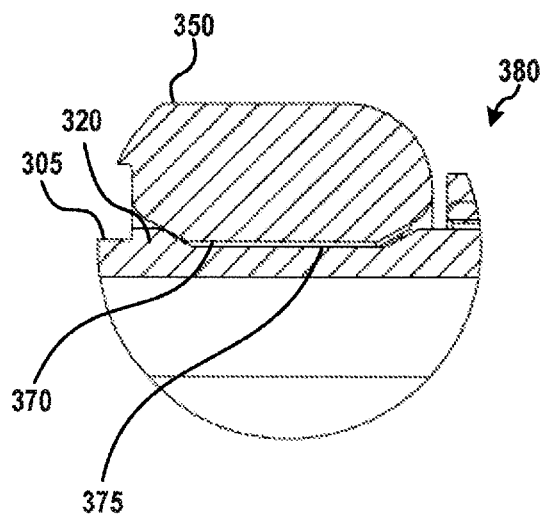

FIG. 3B depicts a cross-sectional view of the connector assembly 300 and FIG. 3C depicts detail 390 of FIG. 3B. As shown in FIGS. 3A-3C, an external surface of the frame 380 may include one or more locking recesses 375 configured to receive one or more corresponding locking projections 370 arranged on an inner surface of the ring portion 360. The latch component 350 may include one or more compression sections 365b (compression section 365a is not visible in FIG. 3A, see FIG. 3E). As shown in FIGS. 3A and 3C, the locking projections 370 may engage the locking recesses 375 to prevent the rotation of the latch component 350 with respect to the frame 380.

The compression of the compression sections 365a, 365b causes the shape of the ring portion 360 to become deformed. For example, the shape of the ring portion 360 may have a generally circular-shape when the compression sections 365a, 365b are not compressed and a generally oval-shape when the compression sections are compressed. When the compression sections 365a, 365b are compressed, the locking projections 370 move out of the locking recesses 375 and the latch component 350 may rotate with respect to the frame 380. When the compression sections 365a, 365b are not compressed, the locking projections 370 may be inserted into the locking recesses 375 and the latch component 350 may be locked in place with respect to the frame 380. Accordingly, the latch component 350 may be rotated to the other side of the frame 380 and the connector assembly 300 may be rotated to connect with a corresponding adapter with a different polarity.

Figure 3D:
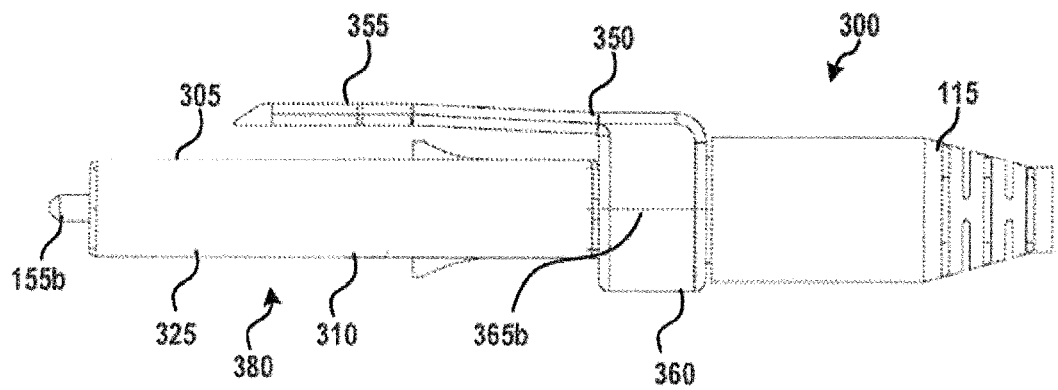
Figure 3E:
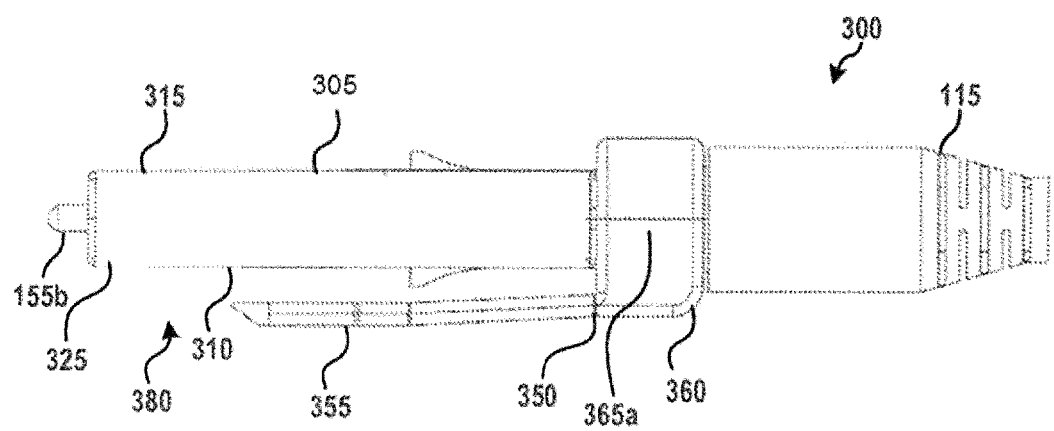
Figure 3F:
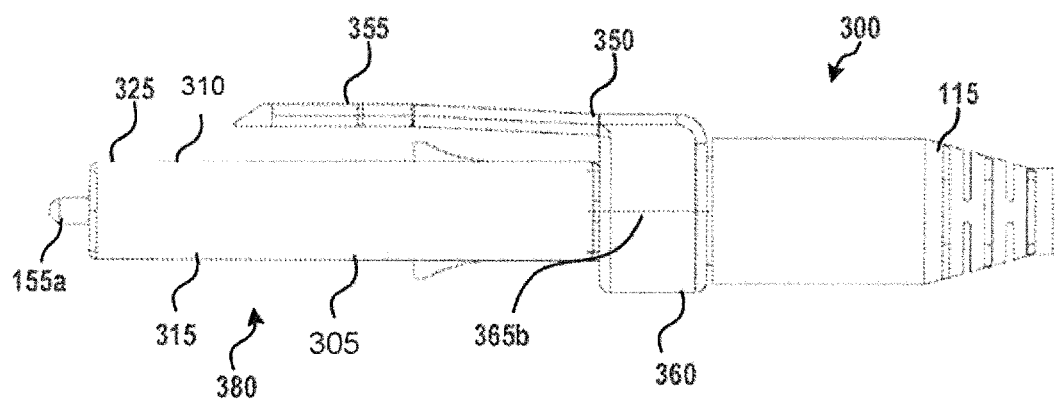

FIGS. 3D-3F depict an illustrative polarity adjustment for the connector assembly 300. In FIG. 3D, the connector assembly 300 is arranged in a first polarity in which the connector assembly is configured to connect with an adapter with the second ferrule 155b on the right side and the first ferrule 155a on the left side of the connector assembly from a top-down perspective. The latch component 350 is arranged in a first polarity position on the frame 380, with compression section 365b visible in FIG. 3D and the thumb latch 355 over plug frame portion 315. In FIG. 3E, the compression sections 365a, 365b have been compressed and the latch component 350 has been rotated to a second polarity position, in which compression section 365a is visible in FIG. 3E and the thumb latch 355 is under plug frame portion 325. In FIG. 3F, the entire connection assembly 300 has been rotated such that the connection assembly may connect with an adapter in a second polarity with the second ferrule 155*b* on the left side and the first ferrule 155*a* on the right side of the connector assembly from a top-down perspective. Accordingly, the polarity of the connector assembly 300 may be adjusted by rotating the latch component 350 from a first polarity position to a second polarity position and rotating the connector assembly such that the thumb latch 355 is orientated to engage a corresponding adapter.

Figure 4A:
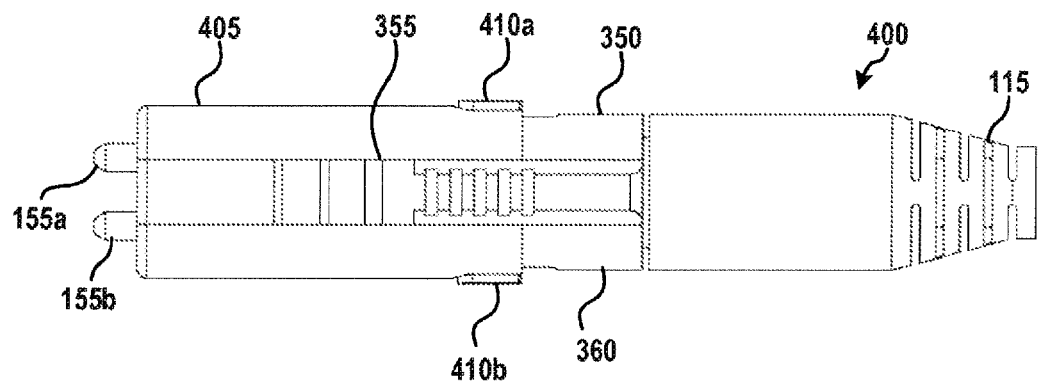
FIGS. 4A-4I depict an illustrative connector assembly according to a third embodiment.

FIGS. 4A-4I depict an illustrative connector assembly according to a third embodiment. FIG. 4A depicts a top-down view of a connector assembly 400 having a housing and compression elements 410*a*, 410*b*. A latch component 350 may have a ring portion 360 disposed around a locking component 430 (not shown, see FIG. 4B). In some embodiments, the compression elements 410*a*, 410*b* may be resilient and biased outward. In some embodiments, compression of compression elements 410*a*, 410*b* may allow latch component 350 to rotate from a first polarity position to one or more other positions.

Figure 4B:
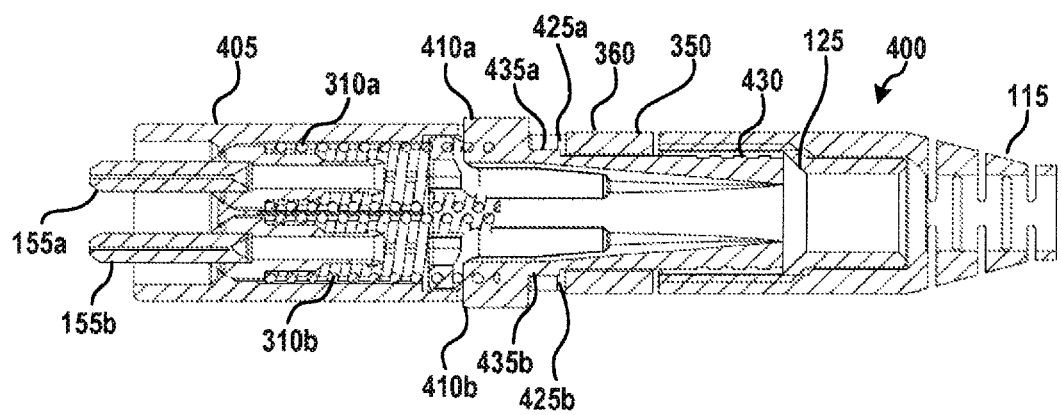

FIG. 4B depicts a cross-sectional view of the connector assembly 400 from a top-down perspective. As shown in FIG. 4B, the compression elements 410*a*, 410*b* may be arranged on a locking component 430. One or more cables (not shown) may extend through the connector assembly 400, for example, through the boot 115, the crimp ring 125, the locking component 430, and the housing 405, and terminating at the ferrules 155*a*, 155*b*. When the compression elements 410*a*, 410*b* are not compressed, locking elements 435*a*, 435*b* arranged on the locking component 430 may engage the latch component 350 to prevent rotation thereof. In some embodiments, the locking elements 435*a*, 435*b* may engage a locking recess 425*a*, 425*b* formed in the ring portion 360 of the latch component 350. Compression of the compression elements 410*a*, 410*b* may cause the locking elements 435*a*, 435*b* to move inward such that they no longer engage the latch component 350, thereby allowing the latch component to rotate about the locking component 430. As the latch component 350 rotates around the locking component 430, the outward bias of the locking elements 435*a*, 435*b* may cause the locking components to press against the inner surface of the ring portion 360. Accordingly, when a locking recess 425*a*, 425*b* is located over a locking element 435*a*, 435*b* without the compression elements 410*a*, 410*b* being compressed, the locking element may push outward and re-engage the locking recess 425*a*, 425*b*.

Figure 4C:
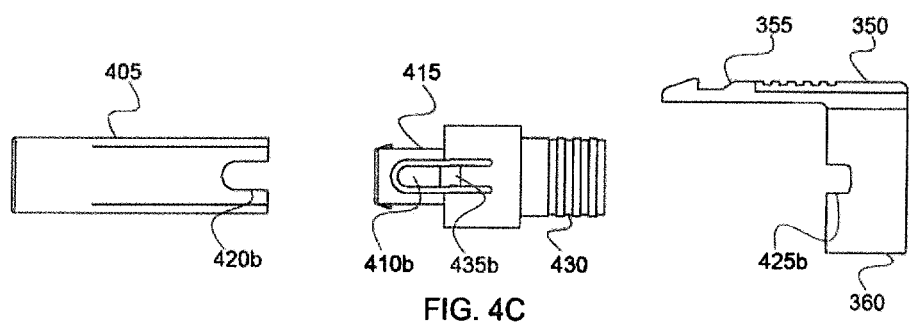
Figure 4D:
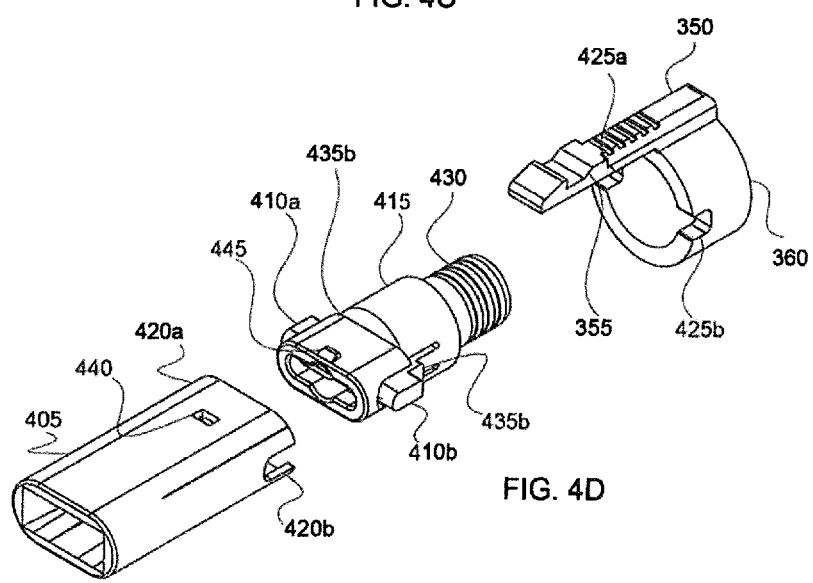
Figure 4E:
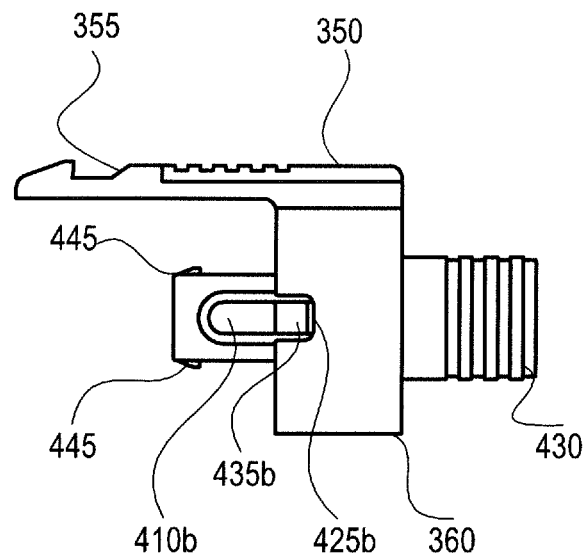
Figure 4F:
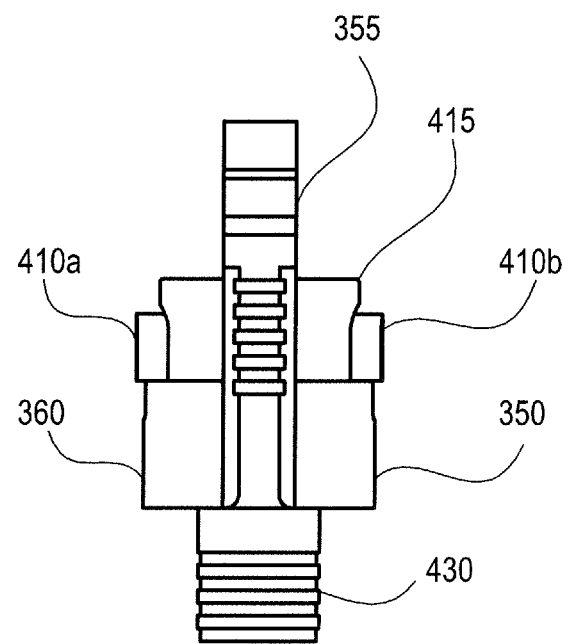

FIGS. 4C and 4D depict the housing 405, locking component 430, and latch component 350 in a side view and a perspective view, respectively. As shown in FIGS. 4C and 4D, the housing 405 may include channels configured to receive the compression elements 410*a*, 410*b*. In some embodiments, the housing 405 may include one or more openings 440 configured to receive a complementary projection 445 on the locking component 430 to secure the locking component in place within the connector assembly 400. FIGS. 4E and 4F depict the latch component 350 and the locking component 430 as arranged within the connector assembly 400 from a side view and a top-down view, respectively.

Figure 4G:
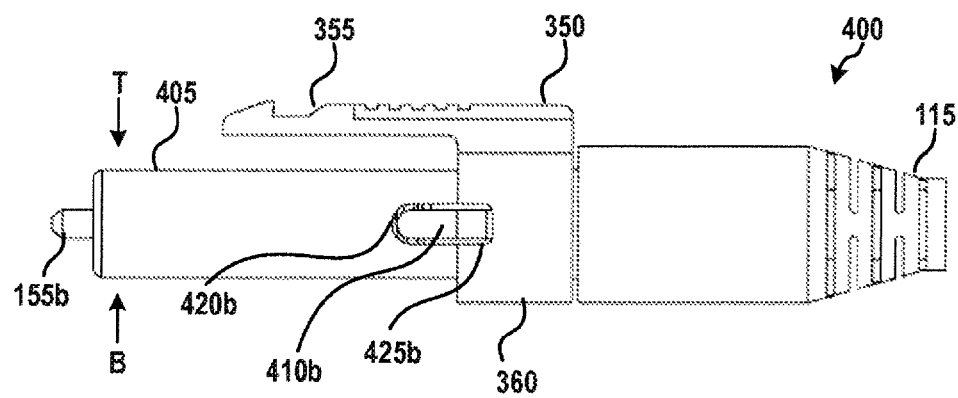
Figure 4H:
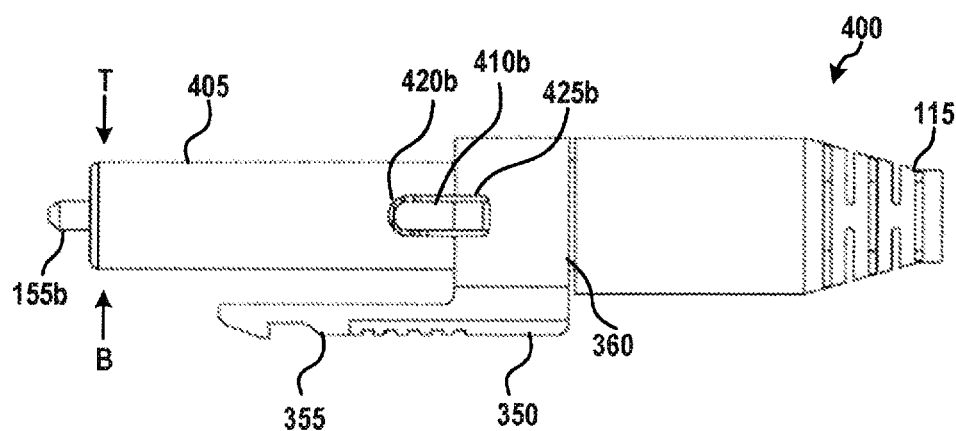
Figure 4I:
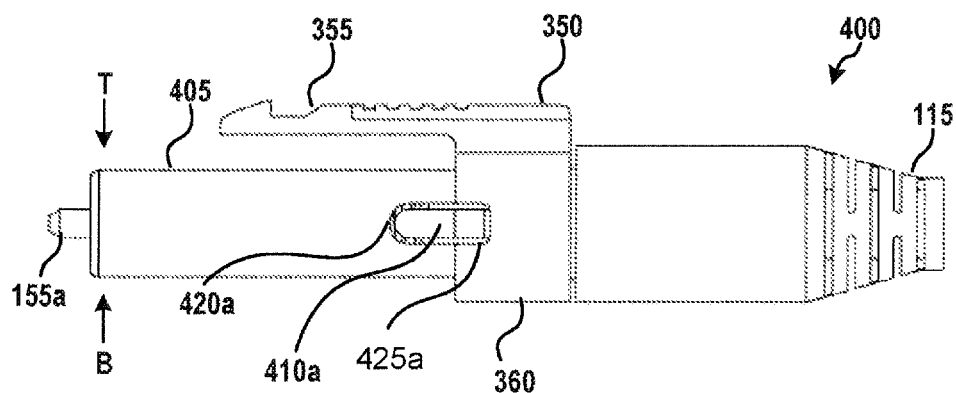

FIGS. 4G-4I depict an illustrative polarity adjustment for the connector assembly 400. In FIG. 4G, the connector assembly 400 is arranged in a first polarity in which the connector assembly is configured to connect with an adapter with the second ferrule 155*b* on the right side and the first ferrule 155*a* on the left side of the connector assembly from a top-down perspective. The latch component 350 is arranged in a first polarity position on the locking component 430, with locking recess 425*b* visible in FIG. 4G and the thumb latch 355 being arranged over a top (T) surface of the housing 405. In FIG. 4H, the latch component 350 has been rotated to a second polarity position, in which locking recess 425*b* is visible in FIG. 4H and the thumb latch 355 is arranged under a bottom (B) surface of the housing 405. In FIG. 4I, the entire connection assembly 400 has been rotated such that the connection assembly may connect with an adapter in a second polarity with the second ferrule 155*b* on the left side and the first ferrule 155*a* on the right side of the connector assembly from a top-down perspective. Accordingly, the polarity of the connector assembly 400 may be adjusted by rotating the latch component 350 from a first polarity position to a second polarity position and rotating the connector assembly such that the thumb latch 355 is orientated to engage a corresponding adapter.

Although a fiber optic connector has been used as an illustrative embodiment, this detailed description is not so limited, as any type of electrical and/or communication connector may be used according to some embodiments. The connectors, adapters, and connection assemblies formed therefrom may be used in combination with other connection elements and/or materials, such as crimpers, bands, straps, ferrules, locking materials, fluids, gels, or the like.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to"). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example), the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, or the like. As a non-limiting example, each range discussed herein can be readily broken down into a lower third, a middle third, and an upper third. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A connector assembly comprising:
   a housing having a connection end and a cable end, the housing including a first housing component and a second housing component, the first housing component being connected to the second housing component to form the housing, the second housing component including a plug frame portion at the connection end and a back post portion at the cable end, the back post portion being formed for securing a fiber optic cable to the housing, the back post portion being tubular in shape and projecting away from the plug frame portion, the plug frame portion and the back post portion being formed as one piece of material, the plug frame portion including a first LC plug frame section configured to define part of a first individual LC plug frame and a second LC plug frame section configured to define part of a second individual LC plug frame, the second LC plug frame section being separated from the first LC plug frame section by a gap;
   ferrules mounted in the plug frame portion of the second housing component, the ferrules comprising a first LC ferrule mounted in the first LC plug frame section and a second LC ferrule mounted in the second LC plug frame section;
   a latch component connected to the housing and configured for releasably connecting the connector assembly to another optical device.

2. The connector assembly of claim 1, wherein the plug frame portion of the second housing component has an open side that is closed by connection of the first housing component to the second housing component.

3. The connector assembly of claim 2 wherein the second housing component further comprises a middle portion located between the plug frame portion, the middle portion being formed as one piece of material with the plug frame portion and the back post portion.

4. The connector assembly of claim 3 wherein the middle portion of the second housing component has an open side that is closed by the connection of the first housing component to the second housing component.

5. The connector assembly of claim 1 wherein the back post portion has an open side that is closed by the connection of the first housing component to the second housing component.

6. The connector assembly of claim 1 wherein the latch component is rotatable on the housing between a first position on one side of the housing to a second position on another side of the housing.

7. The connector assembly of claim 6, further comprising a locking component associated with the housing and a mating locking component associated with the latch component for holding the latch component in one of the first and second positions.

8. The connector assembly of claim 6, wherein the latch component comprises a ring portion received on the housing.

9. The connector assembly of claim 1, wherein the connector assembly is a duplex LC-type connector.

10. A connector assembly having an adjustable polarity, comprising:
a housing having a connection end and a cable end, the housing including a plug frame portion at the connection end and a back post portion at the cable end, the back post portion being formed for securing a fiber optic cable to the housing;
ferrules mounted in the plug frame portion of the housing, each ferrule extending along a ferrule axis;
a latch component connected to the housing and configured for releasably connecting the connector assembly to another optical device, the latch component comprising a latch portion and a receiving portion, the receiving portion receiving a portion of the housing therein, the latch component being configured to rotate on the housing about an axis parallel to the ferrule axes to change the polarity of the connector assembly from a first polarity to a second polarity.

11. The connector assembly of claim 10, wherein the receiving portion comprises a ring portion received on the housing.

12. The connector assembly of claim 11, further comprising a locking component associated with the housing and a mating locking component associated with the latch component for holding the latch component in one of the first and second positions.

13. The connector assembly of claim 12 wherein the locking component associated with the latch component is located on the ring portion.

14. The connector assembly of claim 10, wherein the connector assembly is a duplex LC-type connector.

15. A connector assembly comprising:
a housing having a connection end and a cable end, the housing including a plug frame portion and a back post portion, the back post portion having an opening arranged to receive optical fibers into the housing, the opening having a central axis along which the optical fibers are received into the housing;
ferrules supported in the plug frame portion of the housing, the ferrules being configured for connection to the optical fibers;
a latch component comprising a latch configured to releasably couple the connector assembly to an adapter, and a rear portion connected to the latch, the latch component being constructed for releasable connection to the housing so that in a connected condition the latch component is connected to the housing and the rear portion extends around the central axis of the back post portion in a closed loop, and in a disconnected position, the latch and rear portion of the latch component being rotatable conjointly about the central axis of the back-post portion opening.

16. The connector assembly of claim 15 wherein the latch and the rear portion are connected together and remain connected together in the disconnected condition of the latch component.

17. The connector assembly of claim 16 wherein the latch and the rear portion are formed as a single piece of material.

18. The connector assembly of claim 15 wherein the rear portion includes a ring portion defining the closed loop.

19. The connector assembly of claim 18 wherein the ring portion is configured for connection to the housing.

20. The connector assembly of claim 11, wherein the latch component is configured to rotate on the housing about the axis parallel to the ferrule axes to change the polarity of the connector assembly from the first polarity to the second polarity while the ring portion is on the back post portion of the housing.

* * * * *